June 8, 1943.    C. A. REES    2,321,157
FASTENER DEVICE
Filed March 13, 1942
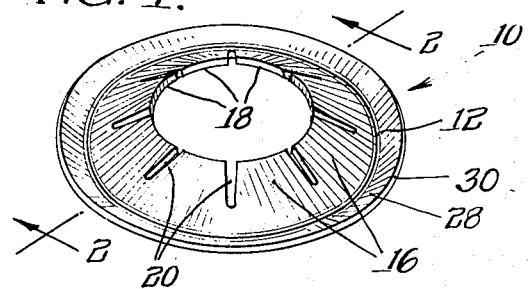
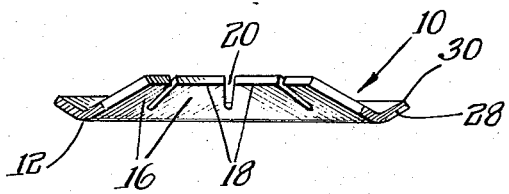
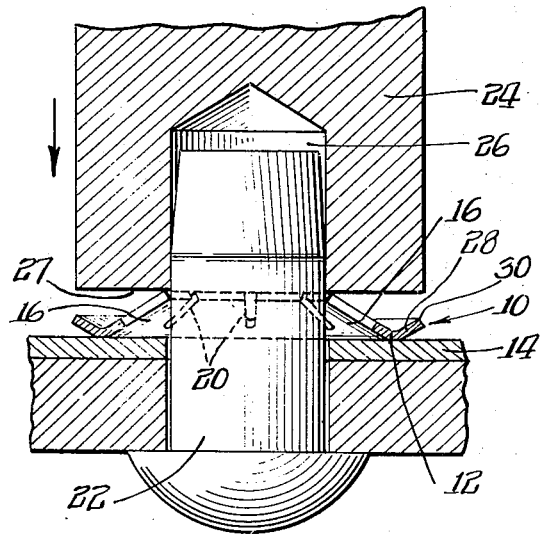
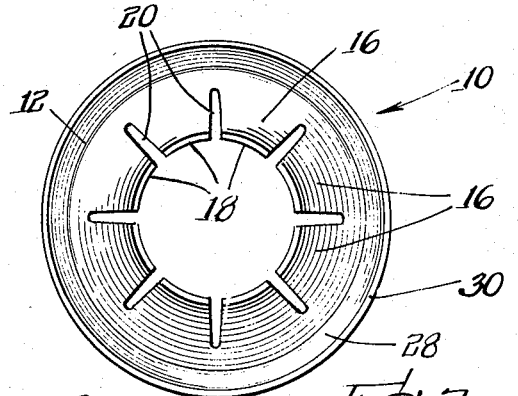
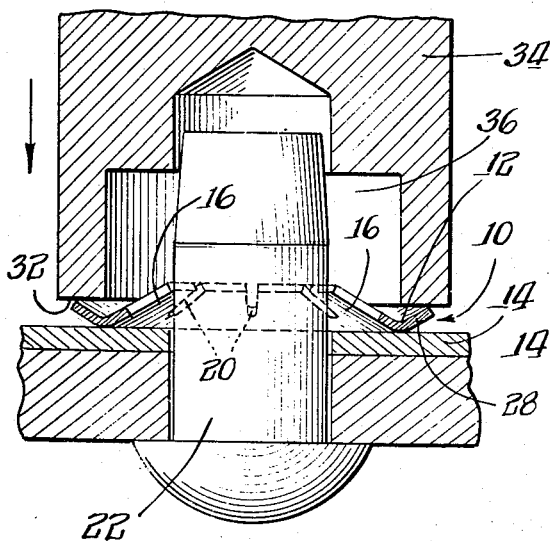
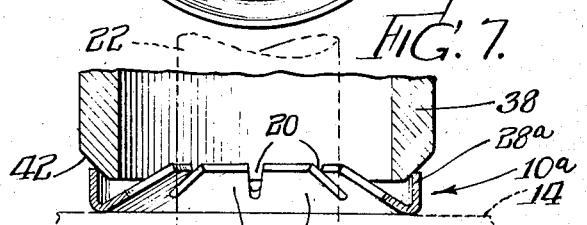
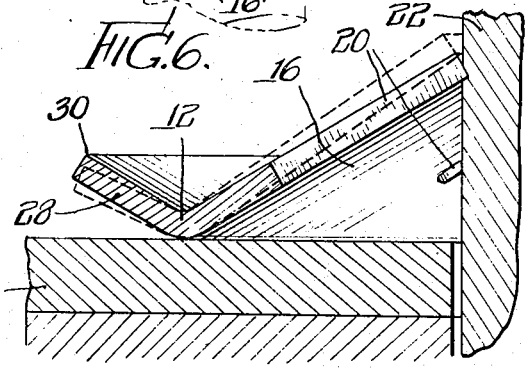
INVENTOR.
Clarence A. Rees
By:- Cox Moore & Olson
attys Patented June 8, 1943

2,321,157

UNITED STATES PATENT OFFICE 2,321,157

FASTENER DEVICE

Clarence A. Rees, Chicago, Ill., assignor to Illinois Tool Works, Chicago, Ill., a corporation of Illinois Application March 13, 1942, Serial No. 434,454

6 Claims. (Cl. 85—36)

This invention relates generally to fastener devices and more particularly to fastener devices for securing stud members and the like against axial displacement with respect to a work piece.

One of the important objects of the present invention is to provide a fastener device of the spring washer type which may be telescopically associated with a stud member in such a manner as to lockingly grip the periphery of said stud member and which may be very conveniently released by the application of pressure at a point spaced from the stud member.

More specifically, the invention contemplates a fastener device of the spring washer type adapted to be telescopically associated with a stud member and equipped with locking teeth along the internal margin adapted to lockingly engage the periphery of a stud member and so constructed that when pressure is applied to the outer margin of the washer the inner washer teeth will automatically be released from the stud member.

The invention contemplates the use of simple pressure applying tools for associating and disassociating washer members of the type set forth above.

It is a further object of the present invention to provide spring washer fasteners as set forth above having a central conical configuration which may be engaged by an anular tool to force the inner margin into locking engagement with the periphery of a stud member, and an outer axially deflected periphery which may also be engaged by an annular tool to cause the inner margin of the washer to be moved or swung away from locking engagement with the stud member.

The foregoing and other objects and advantages will be more clearly understood when consideration is given to the accompanying drawing wherein:

Figure 1 is a perspective view of a sheet metal fastener device which is representative of one embodiment of the invention;

Figure 2 is a transverse sectional view of the device shown in Figure 1, said view being taken substantially along the line 2—2 of Figure 1;

Figure 3 is a plan view of the device shown in Figures 1 and 2;

Figure 4 is a transverse sectional view of the fastener as shown in Figure 2, said fastener being shown in operative association with a stud member and work piece, and for purposes of illustration the tool for setting the locking teeth of the washer is also disclosed in vertical section;

Figure 5 is a view similar to Figure 4 disclosing the manner in which a releasing tool may be employed to engage the outer periphery of the washer and thus effect the release of the washer teeth from the periphery of the stud member;

Figure 6 is an enlarged semi-diagrammatic view illustrating the rocking action of the washer stock which takes place when the inner locking teeth are released from the stud member; and Figure 7 is a sectional view similar to Figure 5 showing a fastener device of modified form.

Referring now to the drawing more in detail, it will be seen that like numerals have been employed to designate similar parts throughout the various figures and that one embodiment of the invention includes a washer member designated generally by the numeral 10. This washer member 10 includes an intermediate body portion 12 which on its underside provides an annular surface for engaging a work piece 14 as illustrated in Figures 4 to 6, inclusive. Diverging axially from the intermediate body portion 12 is an inner marginal portion comprising a plurality of resilient prongs 16, the inner extremities of which present locking edges or teeth 18. The prongs 16 in the disclosed embodiment are separated by radial slits 20 and in the aggregate these prongs present a frusto-conical form.

The washer 10 may be telescopically associated with a stud member 22, as shown in Figure 4, and after the intermediate body portion 12 has been moved into engagement with the surface of the work piece 14, a suitable setting tool 24 may be employed. This tool is provided with a central aperture or recess 26 for receiving the free extremity of the stud member 22, as clearly shown in Figure 4. The annular surface 27 engages the free extremities of the prongs 16 so as to force the teeth 18 thereof into locking impingement with the periphery of the stud member. Such locking impingement prevents axial displacement of the stud member 22 with respect to the work piece.

Attention is now directed to a continuous annular rim 28 which diverges or inclines outwardly from the intermediate body portion 12 so as to present a peripheral edge 30 spaced axially from the plane of the underside of the intermediate body portion 12, or in other words axially spaced from the surface of the work piece 14. This rim 28 is relatively narrow as compared with the portion of the washer stock extending inwardly from the intermediate body portion 12. In fact, the rim 28 must be sufficiently rigid so that when the annular surface 32 of a tool 34 is pressed against the peripheral edge 30 the prongs 16 will be swung outwardly so as to release the teeth 18 thereof from impingement with the stud 22. This action is best illustrated in Figure 6 wherein the solid line configuration of the washer member illustrates the locking position of the prongs 16 and stud engaging teeth 18. When pressure is applied to the periphery 30 by the tool 34, the washer stock experiences a rocking action from the solid line position to the dotted line position of Figure 6. This causes the washer teeth 18 to clear the periphery of the stud 22 and places a permanent set in the washer stock so that the washer is free to be telescopically removed from the stud. The tool 34 is provided with a central recess 36, the lower portion of which is wider than the inner communicating portion to clear the internal marginal portion of the washer when the tool 34 is pressed downwardly against the peripheral edge 30.

In Figure 7 I have shown a modified construction, the washer member being designated generally by the numeral 10a. The only structural difference between the washer 10 and the washer 10a lies in the configuration of the outer rim 28a. This outer rim 28a extends normal to the work as distinguished from the previously described outer rim 28 which is inclined with respect to the work surface. A tool member 38 is employed which is provided with a central recess 40 for receiving the stud member and which is formed with an annular surface 42 for engaging the free margin of the rim 28a. This annular surface 42 is conical and thus serves to urge or swing the rim 28a outwardly so as to cause the release of the washer teeth from the stud member as previously described in connection with the washer member 10.

In the description and claims hereof, the term "spring washer member" is employed in its broadest sense. That is to say, any perforated spring stock adapted to be used for the purpose herein described, regardless of its shape, falls within the meaning of the term "washer." In the described embodiment the washer member is of circular form but the invention obviously is not limited to that shape.

From the foregoing it will be apparent that my invention provides a very practical stud fastening device which is not only simple to apply but equally simple to detach. Both of the tools 24 and 34 provide a permanent set in the stock of the washer, one to insure positive locking of the washer upon the stud and the other to insure positive disengagement and clearing of the inner margin of the washer with respect to the stud. Obviously teeth or prongs of varied design may be employed, it being only necessary to so configurate the outer margin of the washer as to provide a peripheral area which, when pressure is applied thereto, will rock or swing the prongs away from the associated stud member. That is to say, the invention is not limited to the details of construction disclosed herein but is capable of other modifications and changes without departing from the spirit and scope of the appended claims.

The invention is hereby claimed as follows:

1. A fastener device for securing stud members and the like against axial displacement with respect to a work piece including a spring washer member having an intermediate body portion presenting a work engaging surface, internal marginal teeth integral with said intermediate body portion for lockingly engaging the periphery of a stud member, said teeth being normally spaced axially from the plane of said work engaging surface, and an outer relatively narrow marginal body portion formed integral with said intermediate body portion and diverging from the plane of the work engaging surface thereof, said outer body portion presenting a continuous periphery normally spaced from said plane which may be shifted when the intermediate body portion is in engagement with the work surface to effect the release of the locking teeth from a stud member.

2. In combination with a stud member projecting through an aperture in a work piece, a washer element of resilient material having an intermediate annular portion engaging the surface of the work piece, an inner portion axially diverging from said work surface and marginally severed to present resilient marginal teeth lockingly impinging the periphery of said stud member, and an outer continuous rim diverging from said work surface and presenting a peripheral edge spaced therefrom, said outer rim being sufficiently rigid to effect the shifting of the inner margin of the washer stock away from the periphery of the stud when pressure is applied to said peripheral edge axially toward the work piece.

3. A sheet metal fastener device having an inner marginal section adapted to lockingly impinge the peripheral surface of an elongated member, as, for example, the shank of a stud member, an intermediate body portion having a work engaging surface, and an outer body portion formed integral with said intermediate portion and diverging from the plane of the work engaging surface thereof, said outer body portion presenting a margin normally spaced from said plane so that it may be engaged by the advancing side of a pressure applying surface, the cross-sectional size and shape of said outer body portion being so proportioned to the corresponding cross-sectional size and shape of stock positioned inwardly thereof, that movement of said outer body margin in a given direction will effect a proportional movement of said inner margin and thereby effect the release of said inner marginal section from the periphery of an associated elongated member such as a stud member.

4. A sheet metal fastener device as set forth in claim 3 wherein the inner marginal section comprises a plurality of teeth adapted to lockingly impinge oppositely disposed portions of the peripheral surface of an elongated member, as, for example, the shank of a stud member.

5. A sheet metal fastener device as set forth in claim 3 wherein the work engaging surface of the intermediate body portion is normally spaced axially from the stud engaging portion of the inner marginal section.

6. A sheet metal fastener device as set forth in claim 3 wherein the intermediate and outer body portions are of annular form.

CLARENCE A. REES.